(12) United States Patent
Gault et al.

(10) Patent No.: US 10,794,093 B2
(45) Date of Patent: Oct. 6, 2020

(54) METHOD OF OPTIMIZING MEMORY WIRE ACTUATOR ENERGY OUTPUT

(71) Applicant: Microsoft Technology Licensing, LLC, Redmond, WA (US)

(72) Inventors: Joseph Benjamin Gault, Seattle, WA (US); Scott Douglas Bowers, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 469 days.

(21) Appl. No.: 15/599,879

(22) Filed: May 19, 2017

(65) Prior Publication Data
US 2018/0334835 A1 Nov. 22, 2018

(51) Int. Cl.
*E05B 73/00* (2006.01)
*E05B 27/08* (2006.01)
(Continued)

(52) U.S. Cl.
CPC .......... *E05B 73/0011* (2013.01); *E05B 27/08* (2013.01); *E05B 73/0029* (2013.01); *E05B 73/0082* (2013.01); *F03G 7/065* (2013.01); *G06F 1/1615* (2013.01); *G06F 1/1616* (2013.01); *G06F 1/1637* (2013.01); *G06F 1/1654* (2013.01); *G06F 1/1662* (2013.01); *G06F 1/1669* (2013.01);
(Continued)

(58) Field of Classification Search
CPC .... G06F 1/1679; G06F 1/1654; G06F 1/1669; G06F 1/1656; F03G 7/065; F03G 7/06; E05B 47/0009; E05B 65/0067; E05B 51/005; F16B 1/0014
See application file for complete search history.

(56) References Cited

U.S. PATENT DOCUMENTS 3,767,181 A 10/1973 Van der Burgt et al.
3,940,935 A 3/1976 Richardson et al.
(Continued)

OTHER PUBLICATIONS

Antonello, et al., "Use of antagonistic shape memory alloy wires in load positioning applications", In Proceedings of IEEE 23rd International Symposium on Industrial Electronics , Jun. 1, 2014, pp. 287-292.
(Continued)

*Primary Examiner* — Mark A Williams
(74) *Attorney, Agent, or Firm* — Ray Quinney & Nebeker P.C.; Paul N. Taylor

(57) ABSTRACT

In some embodiments, an apparatus for locking a computing device includes an actuator, a locking protrusion connected to a first portion of the computing device, a locking receptacle connected to a second portion of the computing device, a shape memory material (SMM) wire, and a force conditioner. The SMM wire has a first state and a second state and is movable between states by the actuator. The first state and the second state have first and second lengths, respectively. Moving from the first state to the second state applies a contraction force along a longitudinal direction of the SMM wire. The force conditioner is configured to apply a return force to the SMM wire that opposes the contraction face. The return force returns the SMM wire toward the first state while moving a maximum available force of the SMM wire to the second state of the SMM wire.

20 Claims, 13 Drawing Sheets

(51) Int. Cl.
*F03G 7/06* (2006.01)
*G06F 1/16* (2006.01)
*E05B 65/00* (2006.01)
*E05B 51/00* (2006.01)

(52) U.S. Cl.
CPC .......... *G06F 1/1679* (2013.01); *E05B 51/005* (2013.01); *E05B 65/0067* (2013.01)

(56) References Cited

U.S. PATENT DOCUMENTS

| | | | |
|---|---|---|---|
| 4,131,378 A | 12/1978 | Daws | |
| 4,673,170 A | 6/1987 | Dykema | |
| 5,405,337 A * | 4/1995 | Maynard | A61M 25/0158 604/531 |
| 5,510,957 A | 4/1996 | Takagi | |
| 5,629,662 A | 5/1997 | Floyd et al. | |
| 5,818,182 A | 10/1998 | Viswanadham et al. | |
| 6,129,181 A | 10/2000 | Weems | |
| 6,459,855 B1 | 10/2002 | Kosaka et al. | |
| 6,530,784 B1 * | 3/2003 | Yim | G06F 1/1616 361/679.29 |
| 6,574,958 B1 | 6/2003 | MacGregor | |
| 6,583,985 B2 | 6/2003 | Nguyen et al. | |
| 6,771,494 B2 | 8/2004 | Shimano | |
| 6,781,819 B2 | 8/2004 | Yang et al. | |
| 6,845,005 B2 | 1/2005 | Shimano et al. | |
| 6,944,012 B2 | 9/2005 | Doczy et al. | |
| 7,275,846 B2 | 10/2007 | Browne et al. | |
| 7,380,843 B2 | 6/2008 | Alacqua et al. | |
| 7,433,694 B2 | 10/2008 | Morgan et al. | |
| 7,779,715 B2 | 8/2010 | Mitteer | |
| 7,814,810 B2 | 10/2010 | Mitteer | |
| 8,083,718 B2 | 12/2011 | Rush et al. | |
| 8,275,758 B2 | 9/2012 | Tanabe et al. | |
| 8,339,842 B2 | 12/2012 | Boutchich | |
| 8,827,331 B2 | 9/2014 | Corcoran et al. | |
| 8,839,417 B1 | 9/2014 | Jordan | |
| 8,947,861 B2 | 2/2015 | Staats et al. | |
| 9,032,130 B2 | 5/2015 | Aldana et al. | |
| 9,069,527 B2 | 6/2015 | Leong et al. | |
| 9,091,251 B1 | 7/2015 | Ullakko et al. | |
| 9,152,789 B2 | 10/2015 | Natarajan et al. | |
| 9,378,361 B1 | 6/2016 | Yen et al. | |
| 9,392,007 B2 | 7/2016 | Giokas | |
| 9,419,992 B2 | 8/2016 | Ricafort et al. | |
| 9,438,565 B2 | 9/2016 | Cohen et al. | |
| 9,450,170 B2 | 9/2016 | Schiepp et al. | |
| 9,501,345 B1 | 11/2016 | Lietz et al. | |
| 9,503,463 B2 | 11/2016 | Karta et al. | |
| 9,509,684 B1 | 11/2016 | Dixson-Boles et al. | |
| 2002/0040227 A1 | 4/2002 | Harari et al. | |
| 2004/0068985 A1 | 4/2004 | Mernoe | |
| 2005/0046374 A1 | 3/2005 | Ogawa et al. | |
| 2006/0267376 A1 * | 11/2006 | McKnight | B60K 11/085 296/180.5 |
| 2008/0059474 A1 | 3/2008 | Lim | |
| 2008/0127684 A1 | 6/2008 | Rudduck et al. | |
| 2010/0161960 A1 | 6/2010 | Sadasivan | |
| 2011/0154817 A1 | 6/2011 | Zimmer et al. | |
| 2012/0102169 A1 | 4/2012 | Yu et al. | |
| 2012/0308294 A1 * | 12/2012 | Corcoran | G11B 33/125 403/33 |
| 2013/0021738 A1 | 1/2013 | Yang et al. | |
| 2013/0047210 A1 | 2/2013 | Rotman | |
| 2014/0026554 A1 | 1/2014 | Browne et al. | |
| 2014/0027108 A1 | 1/2014 | Lopez et al. | |
| 2014/0130316 A1 | 5/2014 | Rudduck et al. | |
| 2014/0193193 A1 | 7/2014 | Wikander et al. | |
| 2014/0225708 A1 | 8/2014 | Usoro | |
| 2014/0347802 A1 * | 11/2014 | Lee | G06F 1/1626 361/679.17 |
| 2014/0362509 A1 | 12/2014 | Lin | |
| 2015/0055289 A1 * | 2/2015 | Chang | G06F 1/1632 361/679.43 |
| 2015/0116926 A1 | 4/2015 | Robinson et al. | |
| 2015/0207059 A1 | 7/2015 | Laufenberg et al. | |
| 2015/0281355 A1 | 10/2015 | Maturana et al. | |
| 2016/0004279 A1 | 1/2016 | Delpier et al. | |
| 2016/0035608 A1 | 2/2016 | Babbs et al. | |
| 2016/0062411 A1 * | 3/2016 | Morrison | G06F 1/1632 361/679.08 |
| 2016/0105801 A1 | 4/2016 | Wittenberg et al. | |
| 2016/0139679 A1 | 5/2016 | Tatsuya, et al. | |
| 2017/0017273 A1 | 1/2017 | Weldon et al. | |
| 2017/0097663 A1 * | 4/2017 | Gault | G06F 1/1635 |
| 2017/0315592 A1 | 11/2017 | Gault et al. | |
| 2018/0262498 A1 | 9/2018 | Be'ery et al. | |
| 2019/0005272 A1 * | 1/2019 | Gault | E05B 73/0052 |
| 2019/0025890 A1 * | 1/2019 | Gault | G06F 1/1679 |

OTHER PUBLICATIONS

Kohl, et al., "Magnetic Shape Memory Microactuators", In Micromachines, vol. 5, Issue 4, Nov. 18, 2014, 31 pages.

"Microsoft Surface Book Teardown", https://ifixit.com/Teardown/Microsoft+Surface+Book+Teardown/51972, published on: Nov. 3, 2015, 20 pages.

"Final Office Action Issued in U.S. Appl. No. 15/457,554", dated Feb. 26, 2019, 12 Pages.

"Final Office Action Issued in U.S. Appl. No. 15/804,796", dated Jun. 28, 2019, 8 Pages.

"Non Final Office Action Issued in U.S. Appl. No. 15/457,554", dated Nov. 1, 2018, 13 Pages.

"Non Final Office Action Issued in U.S. Appl. No. 15/804,796", dated Nov. 30, 2018, 7 Pages.

"Detect Insider Threats and External Attacks", Retrieved From: https://www.splunk.com/en_us/products/premium-solutions/user-behavior-analytics.html, Retrieved On: Dec. 30, 2016, 8 Pages.

"Infoblox—Active Trust Cloud Datasheet", Retrieved From: https://www.infoblox.com/wp-contentluploads/infoblox-datasheet-infoblox-activetrust-cloud-1.pdf, Feb. 1, 2017, 4 Pages.

"Skyhigh Threat Protection", Retrieved From: https://web.archive.org/web/20160401091034/https://www.skyhighnetworks.com/skyhigh-threat-protection/, Apr. 1, 2016, 7 Pages.

"Non-final Office Action Issued in U.S. Appl. No. 14/956,118", dated Dec. 19, 2016, 13 Pages.

Beeri, Yishai, "On-Premises & In The Cloud: Making Sense of Your Cybersecurity Ecosystem", Retrieved From: http://www.darkreading.com/cloud/on-premises-and-in-the-cloud-making- sense-of-your-cybersecurity-ecosystem/a/d-id/1326994, Sep. 23, 2016, 11 Pages.

Golling, et al., "Privacy-Aware Intrusion Detection in High-Speed Backbone Networks—Design and Prototypical Implementation of a Multi-Layered NIDS", In 9. DFN-Forum Kommunikationstechnologien, Lecture Notes in Informatics (LNI), May 30, 2016, pp. 77-86.

Hollister, Sean, "Lenovo ThinkPad Helix Tablet/laptop Hybrid Gets a Power-Up When it Docks", Retrieved From: http://www.theverge.com/2013/1/6/3844010/lenovo-thinkpad-helix-convertible, Jan. 6, 2013, 3 Pages.

"International Preliminary Report on Patentability Issued in PCT Application No. PCT/US2016/053858", dated Aug. 8, 2017, 7 Pages.

"International Search Report and Written Opinion Issued in PCT Application No. PCT/US2016/053858", dated Dec. 9, 2016, 12 Pages.

"International Search Report and Written Opinion Issued in PCT Application No. PCT/US2018/020992", dated Jul. 4, 2018, 11 Pages.

"International Search Report and Written Opinion Issued in PCT Application No. PCT/US2018/028763", dated Aug. 1, 2018, 12 Pages.

Vilcinskas, Markus, "Types of Risk Events Detected by Azure Active Directory", Retrieved From: https://docs.microsoft.com/en-us/azure/active-directory/active-directory-identityprotection-risk-events-types, Nov. 30, 2016, 5 Pages.

(56) References Cited

OTHER PUBLICATIONS

"Non Final Office Action Issued in U.S. Appl. No. 15/457,554", dated Jul. 12, 2019, 6 Pages.

* cited by examiner

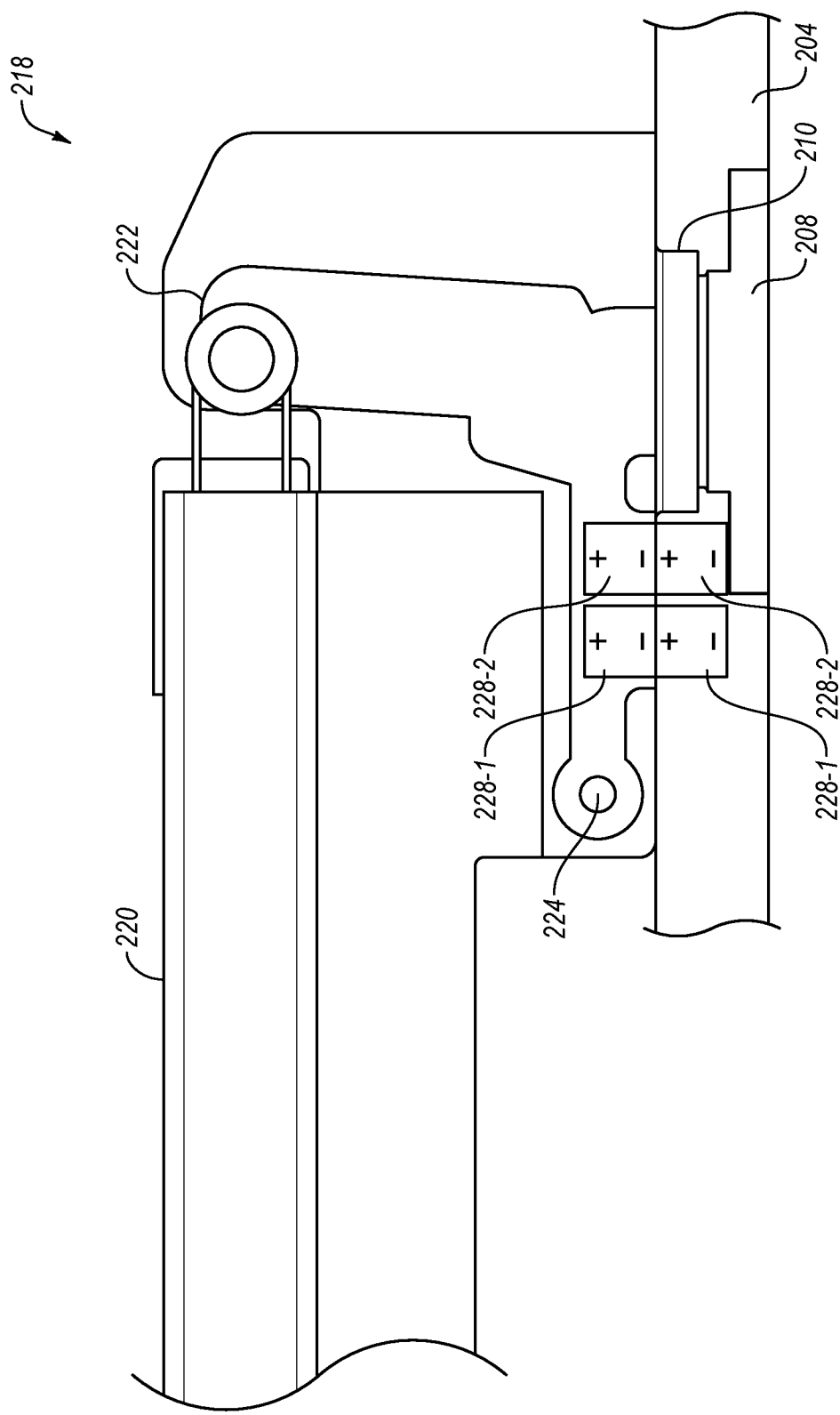

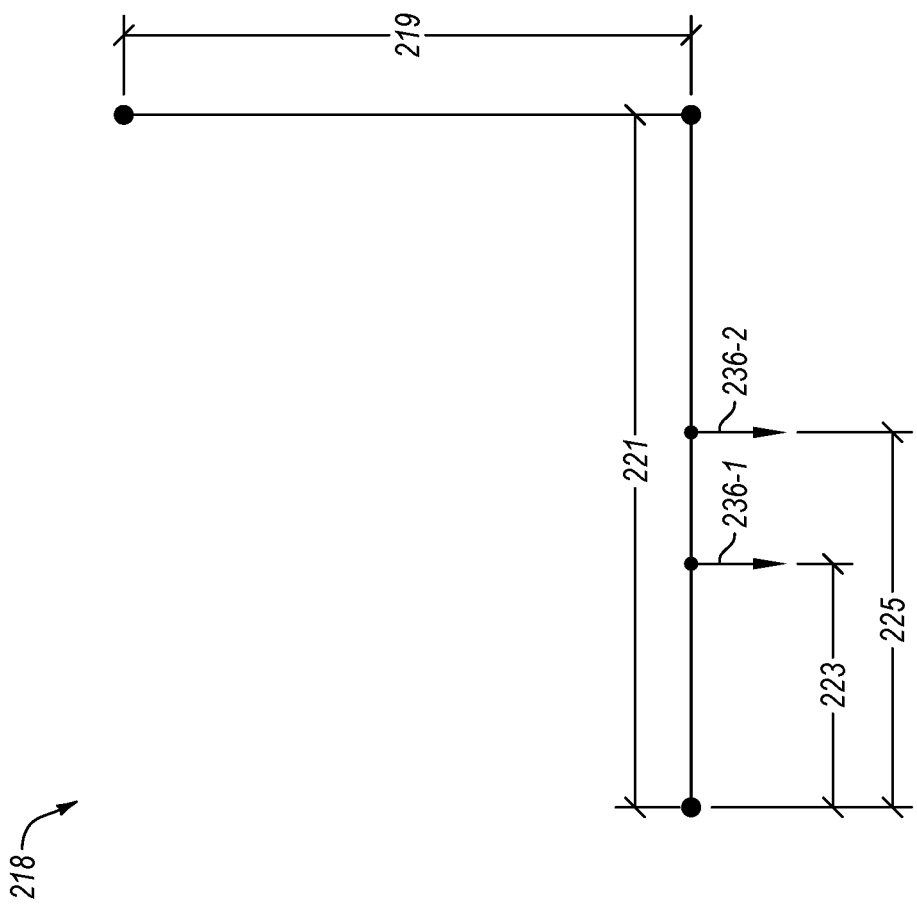

METHOD OF OPTIMIZING MEMORY WIRE ACTUATOR ENERGY OUTPUT

CROSS-REFERENCE TO RELATED APPLICATIONS

N/A

BACKGROUND OF THE DISCLOSURE

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices that may be separated from the screen.

Conventional hybrid computers may connect the screen to the input devices and/or other computing components with a variety of connection mechanisms. Stronger connection mechanisms consume a greater amount of energy, decreasing battery life and/or increasing the operating temperature of the hybrid computer. A robust connection mechanism with small dimensions and lower energy consumption enables a smaller, lighter form factor of the hybrid computer.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

In some embodiments, an apparatus for locking a computing device includes an actuator, a locking protrusion connected to a first portion of the computing device, a locking receptacle connected to a second portion of the computing device, a shape memory material (SMM) wire, and a force conditioner. The SMM wire has a first state and a second state and the SMM wire is movable between the first state and the second state by the actuator. The first state has a first length and the second state has a second length that is shorter than the first length. Moving from the first state to the second state applies a contraction force along a longitudinal direction of the SMM wire. The force conditioner is configured to apply a return force to the SMM wire that opposes the contraction face. The return force returns the SMM wire toward the first state while moving a maximum available force of the SMM wire to the second state of the SMM wire.

In other embodiments, an apparatus for locking an electronic device includes an actuator, a force conditioner, and an arm. The actuator contains an SMM wire configured to apply a contraction force. The force conditioner is configured to apply an opposing force at least partially opposing the contraction force. The arm is movable toward an unlocked position by the actuator and movable toward a locked position by the opposing force. The opposing force is within 10% of a maximum return force between the locked position and the unlocked position.

In yet other embodiments, a method of selectively securing an electronic device includes providing a locking apparatus having an SMM wire configured to apply a contraction force to move the locking apparatus toward an unlocked position, and changing a state of the SMM wire from a first state to a second state to apply the contraction force. The method further includes opposing the contraction force with an opposing force applied by a force conditioner, and decreasing the opposing force over a displacement between a locked position and the unlocked position.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 is a side view of an embodiment of a locking apparatus with a magnet force conditioner, according to at least one embodiment of the present disclosure;

FIG. 4-2 is a free body diagram of the embodiment of a locking apparatus of FIG. 4-1, according to at least one embodiment of the present disclosure;

FIG. 6-1 is a side view of an embodiment of a locking apparatus with a sliding-bar linkage, according to at least one embodiment of the present disclosure;

FIG. 6-2 is a free body diagram of the embodiment of a locking apparatus of FIG. 6-1, according to at least one embodiment of the present disclosure;

DETAILED DESCRIPTION

This disclosure generally relates to devices, systems, and methods for conditioning the force applied by a locking apparatus. More particularly, the present disclosure relates to devices, systems, and methods for increasing available force in a locking apparatus during transition of the locking apparatus from a locked position to an unlocked position.

In some embodiments, the locking apparatus may utilize a shape memory material (SMM) wire that has a first state and a second state. Transitioning the SMM wire from the first state to the second state may contract the SMM wire and apply a longitudinal force along the length of the SMM wire. A force conditioner may apply and/or transmit an opposing return force that opposes the contraction force and may elongate the SMM wire, restoring the SMM wire to the first state. The longitudinal displacement of at least a portion of the SMM wire may move the locking apparatus between the locked position and the unlocked position.

In some embodiments, the force conditioner may oppose the contraction force of the SMM wire during displacement of the SMM wire. For example, the force conditioner may include a spring, which applies an increasing return force as the displacement increases. In other examples, the force conditioner may include one or more magnets, which apply a decreasing return force as displacement increases. In yet other examples, the force conditioner may include one or more mechanical linkages (such as sliding lever arms, cams, or other linkages) that alter the force curve of a spring, a magnet, or other mechanism.

Figure 1:
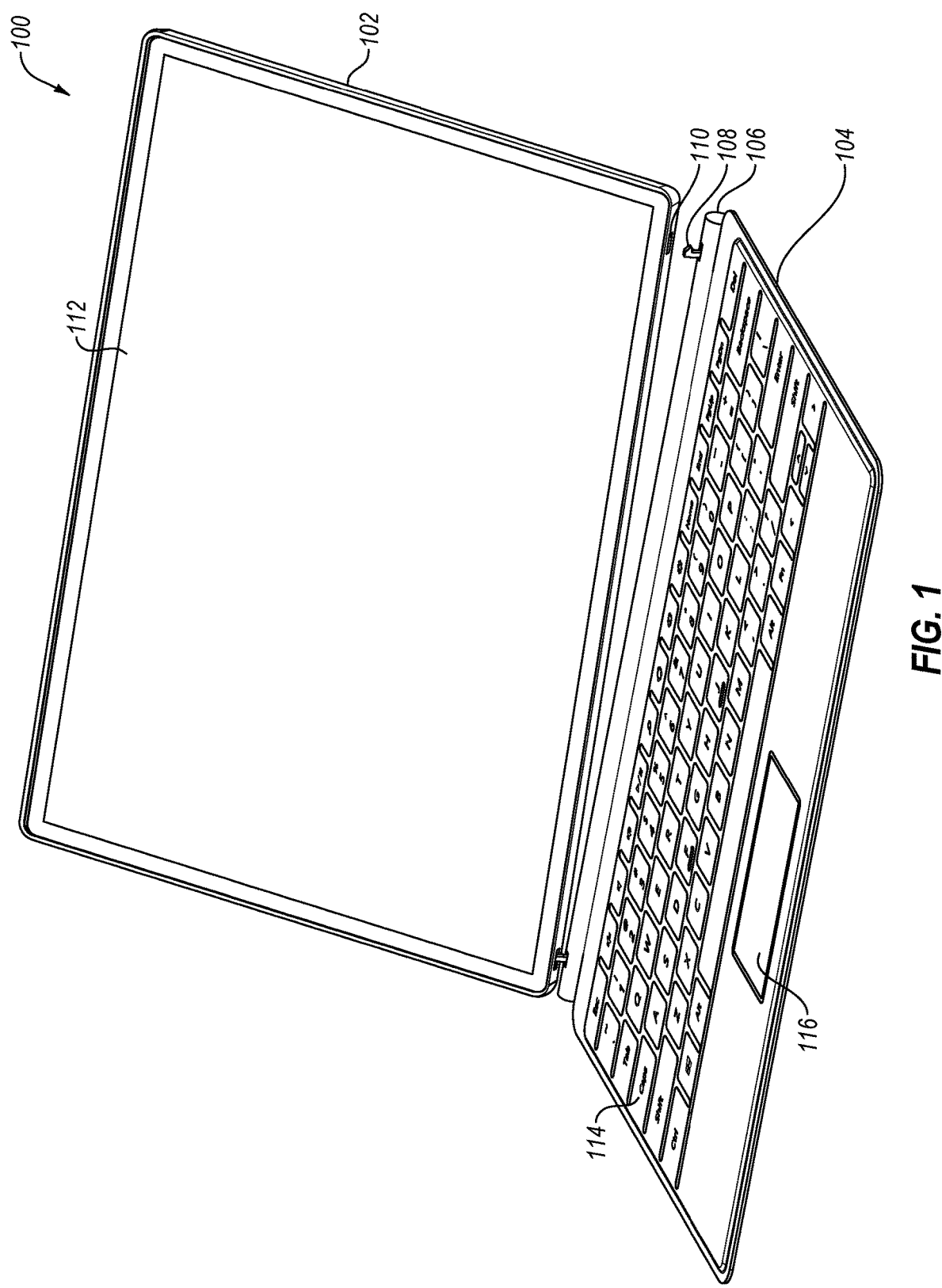
FIG. 1 is a perspective view of an embodiment of a hybrid computing device, according to at least one embodiment of the present disclosure.

FIG. 1 is a perspective view of an embodiment of a hybrid computing device 100. In some embodiments, the hybrid computing device 100 may include a first portion 102 and a second portion 104. For example, the first portion 102 may be connected to the second portion 104 by a hinge 106. In other examples, the first portion 102 may be connected to the second portion 104 by a flexible connector, a rotatable connector, or a plurality of hinges 106.

The first portion 102 and second portion 104 may be selectively coupled together by the engagement and/or disengagement of a locking apparatus. In some embodiments, the hybrid computing device 100 may share computing resources, energy resources, or other resources between the first portion 102 and the second portion 104. Therefore, the locking apparatus may allow the first portion 102 and second portion 104 to be connected in a manner that limits and/or prevents the unintended decoupling of the first portion 102 and second portion 104. The locking apparatus may include a locking protrusion 108 and a locking receptacle 110 that are complimentary positioned on the first portion 102 and second portion 104. While FIG. 1 illustrates the locking protrusion 108 positioned on the second portion 104 and the locking receptacle 110 on the first portion 102, it should be understood that in other embodiments, the locking apparatus may be reversed with the locking protrusion 108 on the first portion 102 and the locking receptacle 110 on the second portion 104.

In some embodiments of a hybrid computing device 100, the first portion 102 may include a display 112, such as a touch sensitive device, an LCD device, or an OLED device, and the second portion 104 may include one or more human interface devices, such as a keyboard 114 or trackpad 116. In other embodiments, each of the first portion 102 and second portion 104 may include one or more electronic and/or computing components. For example, the first portion 102 and/or second portion 104 may include one or more of power supplies, microprocessors, storage devices, input devices, communication devices, thermal management devices, light sources, audio devices, or other electronic and/or computing components. In some embodiments, the locking apparatus may hold one or more contact surfaces of the first portion 102 and second portion 104 in contact with one another, providing electrical and/or data communication between the first portion 102 and second portion 104.

Figure 2:
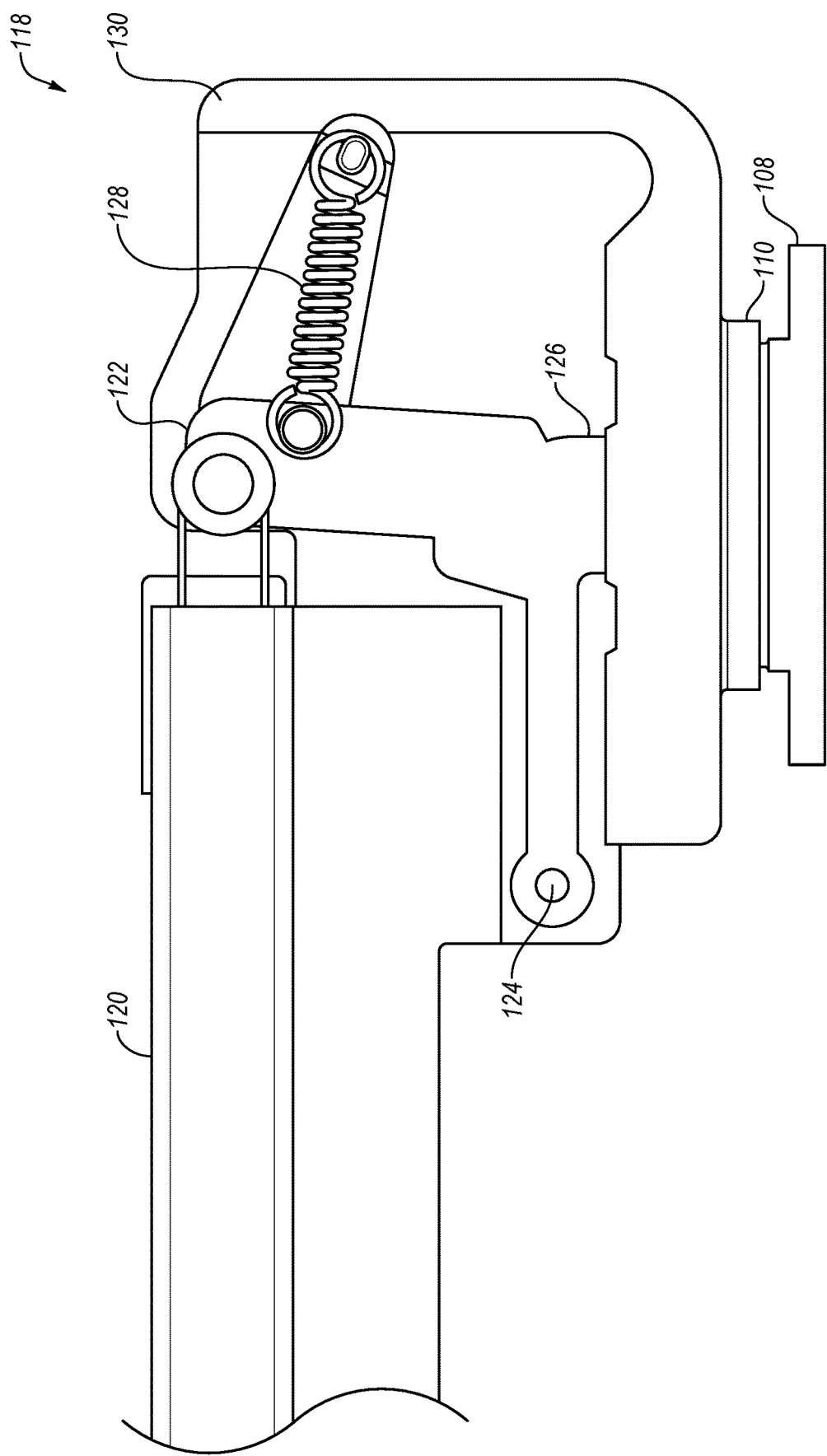
FIG. 2 is a side view of an embodiment of a locking apparatus, according to at least one embodiment of the present disclosure.

FIG. 2 illustrates an embodiment of a locking apparatus 118 that may selectively engage a locking protrusion 108 and a locking receptacle 110. The locking apparatus 118 is shown in a locked position with the locking protrusion 108 positioned in the locking receptacle 110.

In some embodiments, the locking apparatus may include an actuator 120 configured to apply a force in a longitudinal direction of the actuator 120. The actuator 120 may be connected to an arm 122 that is movable about a pivot 124. In some embodiments, the pivot 124 may be a rotatable connection. In other embodiments, the pivot 124 may be flexible connection and/or flexible portion of the arm 122. For example, the pivot 124 may be an elastically deformable portion of the arm 122 that allows the arm 122 to move in response to a force applied by the actuator 120.

In some embodiments, the arm 122 may have a base 126 that is connected to the locking receptacle 110. Movement of the base 126 away from the locking receptacle 110 may disengage one or more features of the locking protrusion 108 to release the locking protrusion 108 relative to the locking receptacle 110. To disengage the locking protrusion 108 and the locking receptacle 110, the actuator 120 may apply a contraction force to the arm 122. Movement of the base 126 toward the locking receptacle 110 may engage one or more features of the locking protrusion 108 to retain the locking protrusion 108 relative to the locking receptacle 110. To engage the locking protrusion 108 and the locking receptacle 110, a spring 128 or other device connected to a frame 130 may apply a return force in a substantially opposite direction to the actuator 120.

In some embodiments, the frame 130 may be part of the first portion and/or second portion of the hybrid computing device (i.e., integrally formed with a casing of the hybrid computing device). In other embodiments, the frame 130 may be a separate component. For example, the frame 130 may connect to and/or support the actuator 120, the arm 122, the spring 128, one or more parts of the locking receptacle 110, or combinations thereof. In at least one example, the frame 130 supports all of the components of the locking apparatus 118.

Figure 3:
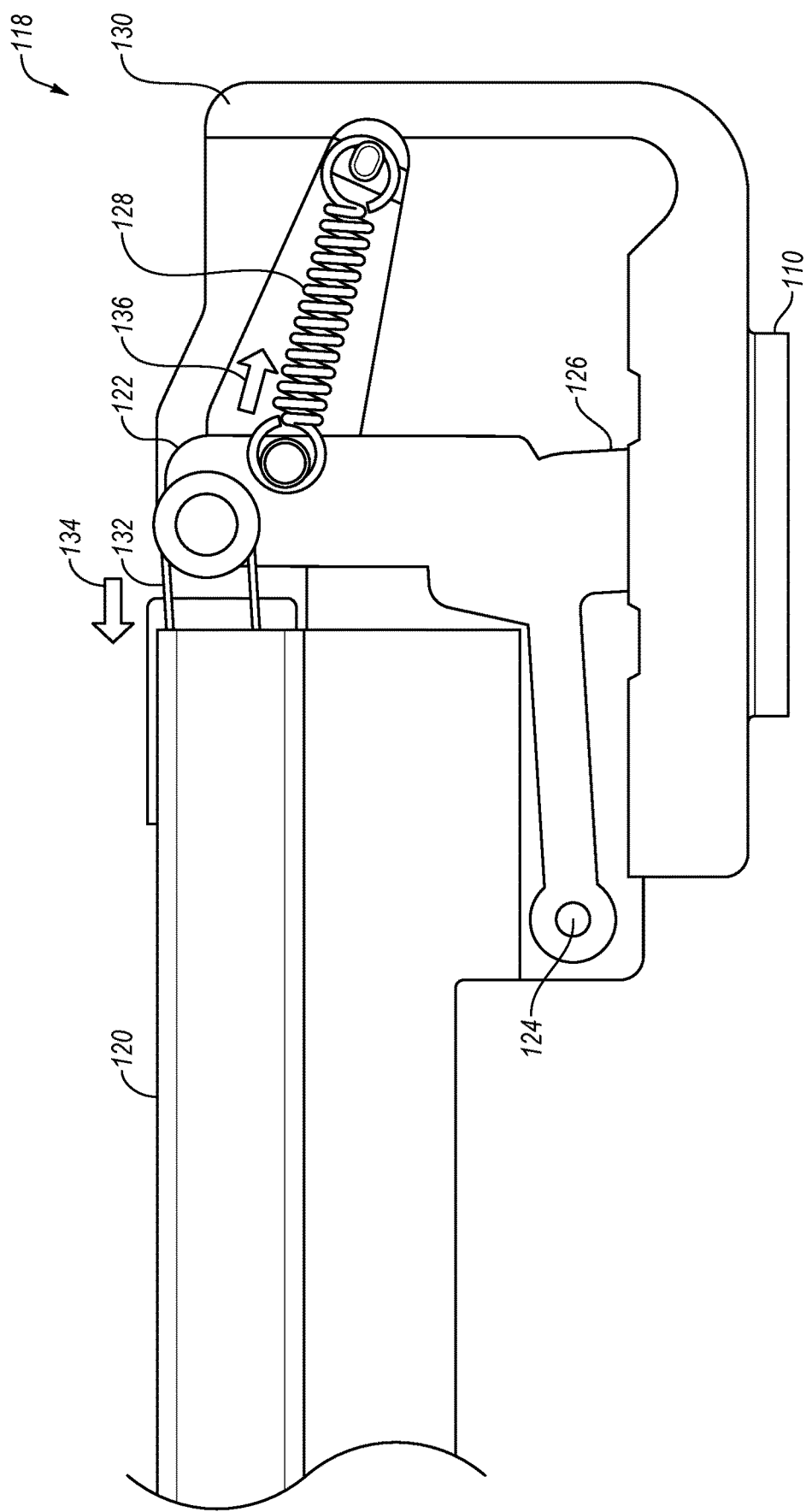
FIG. 3 is a side view of the embodiment of a locking apparatus of FIG. 2 in an unlocked position, according to at least one embodiment of the present disclosure.

FIG. 3 illustrates the embodiment of a locking apparatus 118 of FIG. 2 in an unlocked position. In the unlocked position, the actuator 120 may be actuated to move a SMM wire 132 from a first state to a second state. In some embodiments, the SMM wire 132 may include a SMM such as a shape memory alloy (SMA) or a shape memory polymer (SMP) that may reversibly change shape or dimension based on an external condition. For example, the SMM may transition between a first state and a second state in response to an electrical stimulus, such as a voltage or a current, applied to the SMM wire 132. In other examples, the SMM may transition between a first state and a second state in response to a temperature change of the SMM wire 132. In yet other examples, the SMM may transition between a first state and a second state in response to an applied mechanical force.

In some embodiments, an electrical current may be applied to the SMM wire 132 to increase the temperature of the SMM wire 132, thereby inducing a phase transition from the first state to the second state. For example, an electrical current in a SMM wire 132 containing nickel titanium (e.g., Nitinol) may increase the temperature of the SMM wire 132 above a transition temperature, causing the nickel titanium to transition from a martensite microstructural phase to an austenite microstructural phase. The microstructural phase transition results in an associated macrostructural shape change, shortening the SMM wire 132 and applying a contraction force 134 in a longitudinal direction of the SMM wire 132 and actuator 120.

The SMM wire 132 may be restored to the first state (e.g., the martensite microstructural phase) by mechanical force to elongate the SMM wire 132. Nickel titanium alloys undergo a phase change at approximately 100 MPa of pressure. The nominal force required to restore a 0.31 millimeter (mm) diameter SMM wire 132 that is doubled back, for example as shown in FIG. 3, is approximately 15 Newtons (N). Increasing the cross-sectional area of the SMM wire 132 increases the return force required, and decreasing the cross-sectional area of the SMM wire 132 decreases the return force required.

In some embodiments, the force conditioner, such as the spring 128, may apply the return force 136 to the SMM wire 132 to move the SMM wire 132 to the first state (e.g., the martensite microstructural phase) while elongating the SMM wire 132. Elongating the SMM wire 132 and restoring the SMM wire 132 to the first state may return the arm 122 and base 126 to the locked position illustrated in FIG. 2.

The spring 128 may apply a return force 136 continuously and opposing the contraction force 134. Therefore, the spring 128 may reduce and/or limit the available force of the actuator 120 to move the arm 122. Further, the spring 128 may have a spring rate that increases the return force 136 as the spring 128 elongates, further reducing the available force of the actuator 120 as the SMM wire 132 contracts.

FIG. 4-1 illustrates another embodiment of a locking apparatus 218 with a force conditioner. In some embodiments, a force conditioner may include one or more pairs of magnets 228-1, 228-2 where one of the magnets in each pair of magnets 228-1, 228-2 are connected to the arm 222. Each pair of magnets 228-1, 228-2 may apply a force to the arm 222, urging the arm toward the locked position shown in FIG. 4-1. A pair of magnets 228-1, 228-2 may be positioned with one magnet on the arm 222 configured to move with the arm 222 and an associated magnet in a fixed position. In some embodiments, a pair of magnets 228-1 may having one magnet positioned on the arm 222 of the locking apparatus 218 (with the locking receptacle 210) opposite a second magnet on the second portion 204 (with the locking protrusion 208).

In some embodiments, the movement of the arm 222 from the locked positioned to the unlocked position may move one or more of the pairs of magnets 228-1, 228-2 apart from one another. In other embodiments, the location and the strength of the different pairs of magnets 228-1, 228-2 may be used to tune the magnetic force and the rate at which the magnetic force changes while the arm 222 moves. For example, the first pair of magnets 228-1 may move apart from one another as the arm 222 moves, while the second pair of magnets 228-2 may move apart from one another at a greater rate. Because the magnetic force decreases exponentially as a function of the distance, the force applied to the arm 222 by the second pair of magnets 228-2 may decrease more quickly than the force from the first pair of magnets 228-1.

FIG. 4-2 is a free body diagram of the locking apparatus 218 of FIG. 4-1 illustrating the individual forces applied by the magnets on the arm described in relation to FIG. 4-1. The arm may have an arm height 219 and an arm length 221. In some embodiments, the arm height 219 may be in a range having an upper value, a lower value, or upper and lower values including any of 12 mm, 13 mm, 14 mm, 15 mm, 16 mm, 17 mm, 18 mm, 19 mm, 20 mm, or any values therebetween. For example, the arm height 219 may be greater than 12 mm. In other examples, the arm height 219 may be less than 20 mm. In yet other examples, the arm height 219 may be between 12 mm and 20 mm. In at least one example, the arm height 219 is 15 mm.

In some embodiments, the arm length 221 may be in a range having an upper value, a lower value, or upper and lower values including any of 15 mm, 16 mm, 17 mm, 18 mm, 19 mm, 20 mm, 21 mm, 22 mm, or any values therebetween. For example, the arm length 221 may be greater than 15 mm. In other examples, the arm length 221 may be less than 22 mm. In yet other examples, the arm length 221 may be between 15 mm and 22 mm. In at least one example, the arm length 221 is 22 mm. In at least one embodiment, the height 219 is 15 mm and the arm length 221 is 22 mm.

As shown in FIG. 4-2, the torque applied to the arm about the pivot is at least partially dependent on the magnitude of the first return force 236-1 (applied by the second pair of magnets 228-1 of FIG. 4-1) and the magnitude of the second return force 236-2 (applied by the second pair of magnets 228-2 of FIG. 4-1). Additionally, the torque applied to the arm is at least partially dependent on the first radial length 223 of the first return force 236-1 and the second radial length 225 of the second return force 236-2.

In some embodiments, the first radial length 223 may be in a range of having an upper value, a lower value, or upper and lower values including any of 2 mm, 4 mm, 6 mm, 8 mm, 10 mm, 12 mm, 14 mm, 16 mm, 18 mm, 20 mm, or any values therebetween. For example, the first radial length 223 may be greater than 2 mm. In other examples, the first radial length 223 may be less than 20 mm. In yet other examples, the first radial length 223 may be between 2 mm and 20 mm. In further examples, the first radial length 223 may be between 3 mm and 16 mm. In yet further examples, the first radial length 223 may be between 4 mm and 12 mm. In at least one example, the first radial length 223 is 6.35 mm.

In some embodiments, the second radial length 225 may be greater than the first radial length 223 and be in a range having an upper value, a lower value, or upper and lower values including any of 6 mm, 8 mm, 10 mm, 12 mm, 14 mm, 16 mm, 18 mm, 20 mm, 22 mm, or any values therebetween. For example, the second radial length 225 may be greater than 6 mm. In other examples, the second radial length 225 may be less than 22 mm. In yet other examples, the second radial length 225 may be between 6 mm and 22 mm. In further examples, the second radial length 225 may be between 8 mm and 18 mm. In yet further examples, the second radial length 225 may be between 10 mm, and 14 mm. In at least one example, the second radial length 225 is 12.7 mm. In at least one embodiment, the first radial length 223 is 6.35 mm and the second radial length 225 is 12.7 mm.

The first return force 236-1 and the second return force 236-2 may vary as the angle of rotation of the arm changes. In some embodiments, in the locked position, the first return force 236-1 may be in a range having an upper value, a lower value, or upper and lower values including any of 16 N, 18 N, 20 N, 22 N, 24 N, 26 N, 28 N, 30 N, 32 N, or any values therebetween. For example, the first return force 236-1 in the locked position may be greater than 16 N. In other examples, the first return force 236-1 in the locked position may be less than 32 N. In yet other examples, the first return force 236-1 in the locked position may be between 16 N and 32 N. In further examples, the first return force 236-1 in the locked position may be between 18 N and 30 N. In yet further examples, the first return force 236-1 in the locked position may be between 20 N and 28 N. In at least one example, the first return force 236-1 in the locked position may be 23.4 N.

In some embodiments, the second return force 236-2 in the locked position may be equal to the first return force 236-1 (e.g., both pairs of magnets are the equal in strength and positioned at the same displacement). In other embodiments, the second return force 236-2 in the locked position may be different from the first return force 236-1 in the locked position. For example, the second return force 236-2 may be greater than the first return force 236-1 in the locked position. In other examples, the second return force 236-2 may be less than the first return force 236-1 in the locked position.

In some embodiments, the second return force 236-2 in the locked position may be in a range having an upper value, a lower value, or upper and lower values including any of 16 N, 18 N, 20 N, 22 N, 24 N, 26 N, 28 N, 30 N, 32 N, or any values therebetween. For example, the second return force 236-2 in the locked position may be greater than 16 N. In other examples, the second return force 236-2 in the locked position may be less than 32 N. In yet other examples, the second return force 236-2 in the locked position may be between 16 N and 32 N. In further examples, the second return force 236-2 in the locked position may be between 18 N and 30 N. In yet further examples, the second return force 236-2 in the locked position may be between 20 N and 28 N. In at least one example, the second return force 236-2 in the locked position may be 23.4 N.

Figure 5:
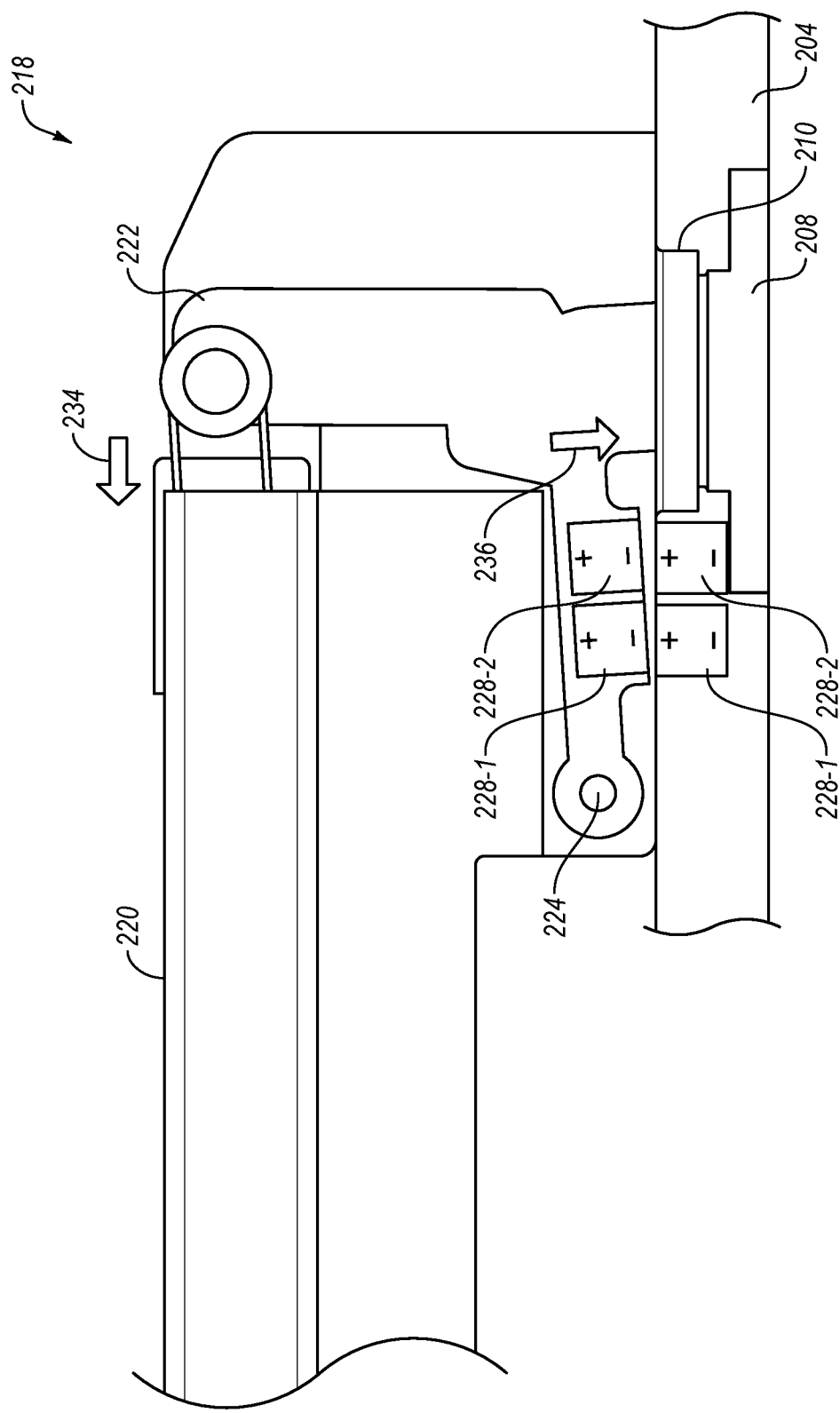
FIG. 5 is a side view of the embodiment of a locking apparatus of FIG. 4-1 in an unlocked position, according to at least one embodiment of the present disclosure.

FIG. 5 is a side view of the locking apparatus 218 of FIGS. 4-1 and 4-2 in an unlocked position. In some embodiments, the actuator 220 may apply a contraction force 234 to rotate the arm 222 about a pivot 224. Opposing the movement of the arm 222 about the pivot 224 is the return force 236 provided by the force conditioner, which in the depicted embodiment, includes the first pair of magnets 228-1 and the second pair of magnets 228-2. Because the return force 236 of each pair of magnets 228-1, 228-2 is based on the proximity of the magnets in each pair, the return force 236 changes depending on the angle of rotation of the arm 222 (and one magnet of each pair of magnets 228-1, 228-2) about the pivot 224, as well as the radial displacement of the pairs of magnets 228-1, 228-2 from the pivot 224. For example, an embodiment of a locking apparatus 218 with a first radial length of 6.35 mm and a second radial length of 12.7 mm where the first return force and second return force in the locked position are both 23.4 N may exhibit a return force 236 according to the following table between the locked position (0° rotation) and the unlocked position (6° rotation):

| Rotation Amount | 1st Magnet 228-1 Separation | 2nd Magnet 228-2 Separation | 1st Magnet 228-1 Force | 2nd Magnet 228-2 Force |
|---|---|---|---|---|
| 0° | 0.0 mm | 0.0 mm | 23.4 N | 23.4 N |
| 2° | 0.23 mm | 0.48 mm | 17.93 N | 14.99 N |
| 4° | 0.46 mm | 0.97 mm | 15.17 N | 11.25 N |
| 6° | 0.70 mm | 1.47 mm | 13.08 N | 8.67 N |

An additional benefit of some embodiments including magnet pairs may be that, in a hybrid computing device, the pairs of magnets 228-1, 228-2 may assist the user in docking the first portion and the second portion of the hybrid computing device. Similarly, moving the locking apparatus 218 to an unlocked position would move the magnets of each pair of magnets 228-1, 228-2 apart from one another, lessening the force, and assisting the undocking of the first portion and the second portion.

Figures 1, 6:
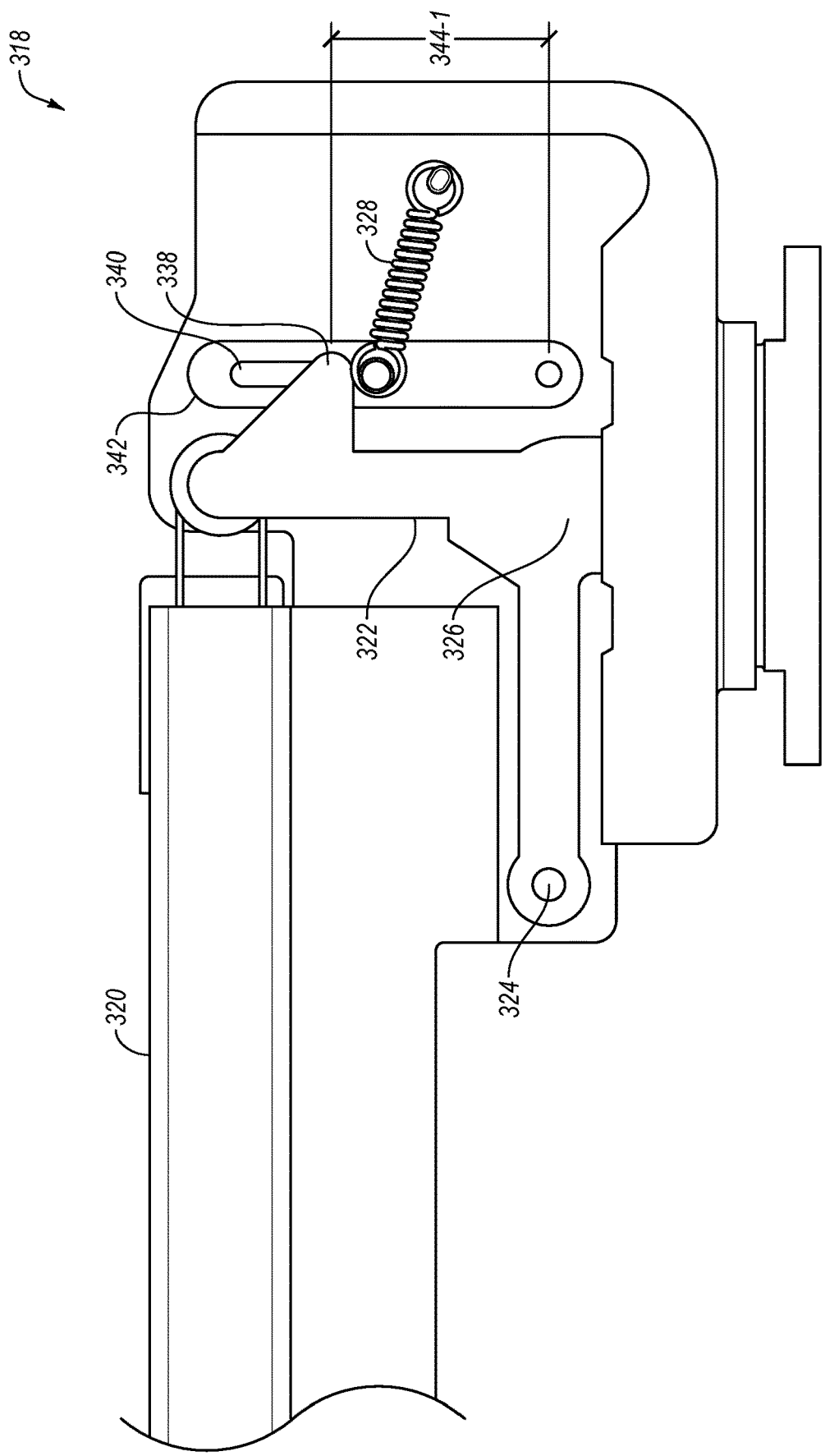
Figures 2, 6:
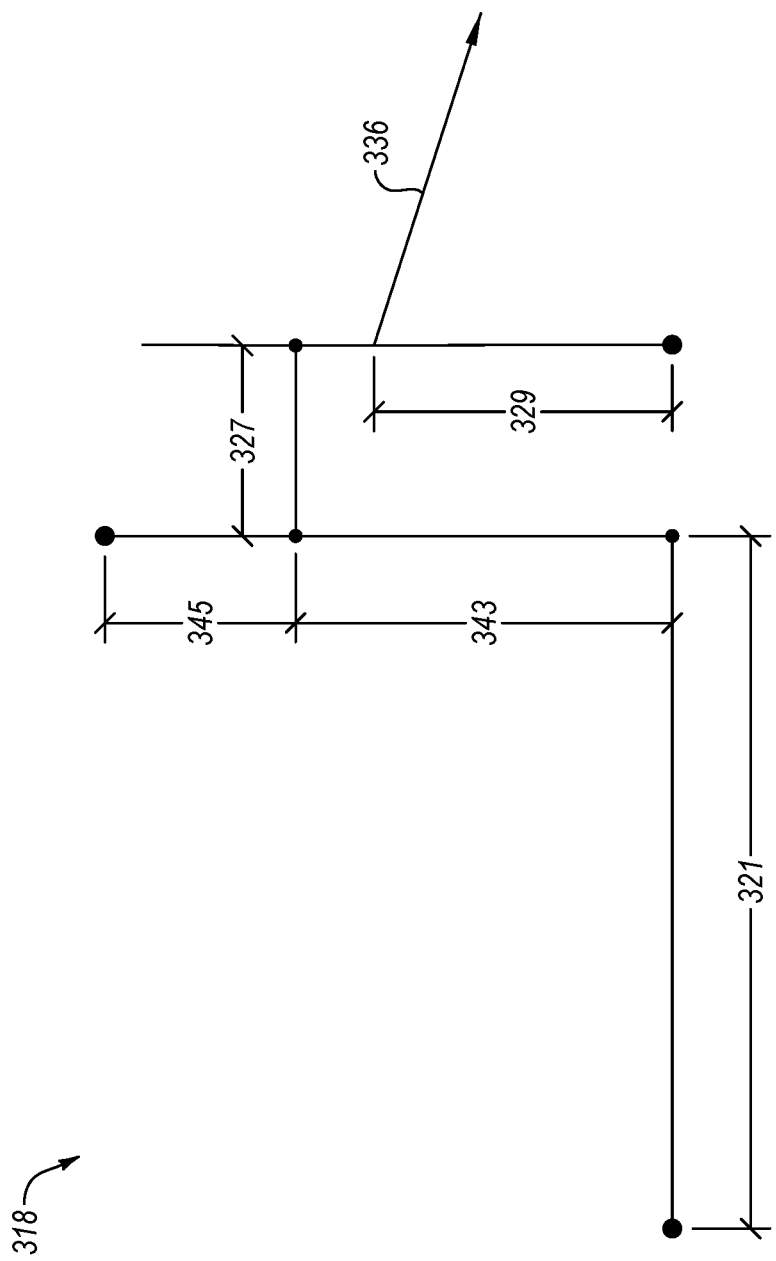

In other embodiments, a locking apparatus may include a mechanical linkage to alter the force curve of a spring during the extension/compression of the spring. FIG. 6-1 illustrates an embodiment of a locking apparatus 318 that utilizes a sliding bar mechanical linkage. In other embodiments, a locking apparatus may include a cam, a gearing, a 4-bar linkage, or other mechanical linkage to alter the force curve of a spring or other device with a linear or non-linear force curve.

In some embodiments, the locking apparatus 318 may include an actuator 320 configured to work on an arm 322 and move the arm 322 relative to a pivot 324. The arm 322 may have a base 326 similar to that described in relation to FIG. 2 and FIG. 3, the movement of which may operate to engage and/or disengage a locking receptacle and locking protrusion.

The locking apparatus 318 may have a mechanical linkage through which a spring 328 or other supply of force may be connected to the arm 322. In some embodiments, the arm 322 may include a post 338 positioned in a slot 340 or groove in a lever 342. The lever 342 may then be connected to the spring 328. The lever 342 may move as the arm 322 moves, with the post 338 translating within the slot 340. The post 338 moving within the slot 340 effectively changes a length of the lever 342 applying a force to the arm 322 from the spring 328. For example, the spring 328 may have a fixed point on the lever 342, while the lever 342 has a locked lever length 344-1 in the locked position. The lever length may change (e.g., increase) as the actuator 320 rotates the arm 322 about the pivot 324 toward the unlocked position.

FIG. 6-2 is a free body diagram of the locking apparatus 318 in the locked position. In some embodiments, the locking apparatus may have an arm length 321 and an arm height that is segmented into a lower arm height 343 and an upper arm height 345. The arm height may be segmented by the position of the post (such as post 338 of FIG. 6-1) in the arm. For example, the lower arm height 343 may be the height of the arm from the base to the post, and the upper arm height 345 may be the height of the arm from the post to the point where the SMM wire acts upon the arm.

In some embodiments, the arm length 321 may be in a range having an upper value, a lower value, or upper and lower values including any of 15 mm, 16 mm, 17 mm, 18 mm, 19 mm, 20 mm, 21 mm, 22 mm, or any values therebetween. For example, the arm length 321 may be greater than 15 mm. In other examples, the arm length 321 may be less than 22 mm. In yet other examples, the arm length 321 may be between 15 mm and 22 mm. In at least one example, the arm length 321 is 22 mm.

In some embodiments, the lower arm height 343 may be in a range having an upper value, a lower value, or upper and lower values including any of 8 mm, 9 mm, 10 mm, 11 mm, 12 mm, 13 mm, or any values therebetween. For example, the lower arm height 343 may be greater than 8 mm. In other examples, the lower arm height 343 may be less than 13 mm. In yet other examples, the lower arm height 343 may be between 8 mm and 13 mm. In at least one example, the lower arm height 343 is 10 mm.

In some embodiments, the upper arm height 345 may be in a range having an upper value, a lower value, or upper and lower values including any of 2 mm, 3 mm, 4 mm, 5 mm, 6 mm, 7 mm, or any values therebetween. For example, the upper arm height 345 may be greater than 2 mm. In other examples, the upper arm height 345 may be less than 7 mm. In yet other examples, the upper arm height 345 may be between 2 mm and 7 mm. In at least one example, the upper arm height 345 is 5 mm.

In some embodiments, a total arm height (e.g., the sum of the lower arm height 343 and the upper arm height 345) may be in a range having an upper value, a lower value, or upper and lower values including any of 15 mm, 16 mm, 17 mm, 18 mm, 19 mm, 20 mm, or any values therebetween. For example, the total arm height may be greater than 15 mm. In other examples, the total arm height may be less than 20 mm. In yet other examples, the total arm height may be between 15 mm and 20 mm. In at least one example, the total arm height is 15 mm.

The spacing 327 between the arm and the lever may alter the rate at which the lever length (e.g., lever length 344-1 described in relation to FIG. 6-1) changes as the arm moves and the post translates in the slot. For example, a larger spacing 327 may result in a greater change in the lever length. In some embodiments, the spacing 327 may be in a range having an upper value, a lower value, or upper and lower values including any of 2 mm, 3 mm, 4 mm, 5 mm, 6 mm, 7 mm, or any values therebetween. For example, the spacing 327 may be greater than 2 mm. In other examples, the spacing 327 may be less than 7 mm. In yet other examples, the spacing 327 may be between 2 mm and 7 mm. In at least one example, the spacing 327 is 5 mm.

The spring force length 329 is a fixed length upon which the return force 336 acts on the lever. As the lever moves, the post may slide in the slot, changing the lever length, while the spring force length 329 remains the same, producing a net reduction in force transmitted to the arm. In some embodiments, the spring force length 329 may be in a range having an upper value, a lower value, or upper and lower values including any of 6 mm, 7 mm, 8 mm, 9 mm, 10 mm, or any values therebetween. For example, the spring force length 329 may be greater than 6 mm. In other examples, the spring force length 329 may be less than 10 mm. In yet other examples, the spring force length 329 may be between 6 mm and 10 mm. In at least one example, the spring force length 329 is 8 mm.

Figure 7:
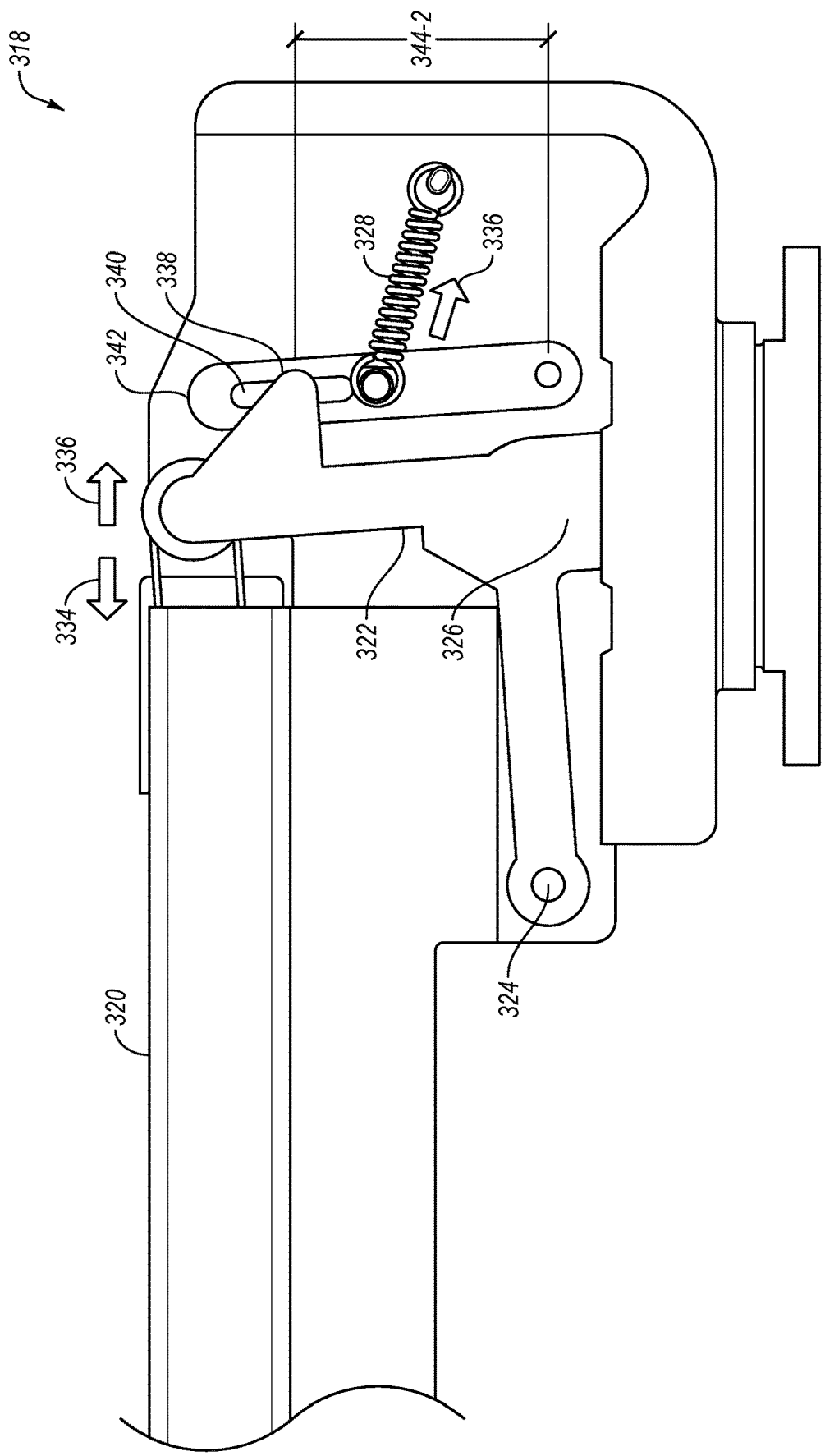
FIG. 7 is a side view of the embodiment of a locking apparatus of FIG. 6-1 in an unlocked position, according to at least one embodiment of the present disclosure.

FIG. 7 is a side view of the locking apparatus 318 of FIGS. 6-1 and 6-2 in an unlocked position. The actuator 320 applies a contraction force 334 to the arm 322 to rotate the arm 322 about the pivot 324 and move the base 326. In response to the movement of the arm 322, the post 338 may translate within the slot 340 of the lever 342 as lever 342 tilts. As the lever tilts, the post 338 may translate from the locked lever length 344-1 (described in relation to FIG. 6-1) to an unlocked lever length 344-2 that is greater than the locked lever length 344-1. The change in lever length reduces the return force 336 applied by the spring 328 that may act upon the arm 322. In some embodiments, the resultant force 346 opposing the contraction force 334 may be less than the return force 336, resulting in a non-linear change in the resultant force 346 on the arm 322 despite a substantially linear increase in the return force 336 from the spring 328.

In some embodiments, the locking apparatus may have a geometry that is a combination of the aforementioned ranges. For example, an embodiment of a locking apparatus may have an arm length of 22 mm, a lower arm height of 10 mm, an upper arm height of 5 mm, a spacing of 5 mm, and a spring force height of 8 mm. In such an embodiment, the return force applied by the spring at the locked position may be 15 N, and at the extended, unlocked position, the spring may apply 16.35 N. While the nominal spring force may increase between the locked position and the unlocked position, the resultant force opposing the SMM wire and actuator may decrease. For example, in the described embodiment, the resultant force opposing the wire may be 7.58 N at the locked position and 7.34 N at the fully extended unlocked position.

Figure 8:
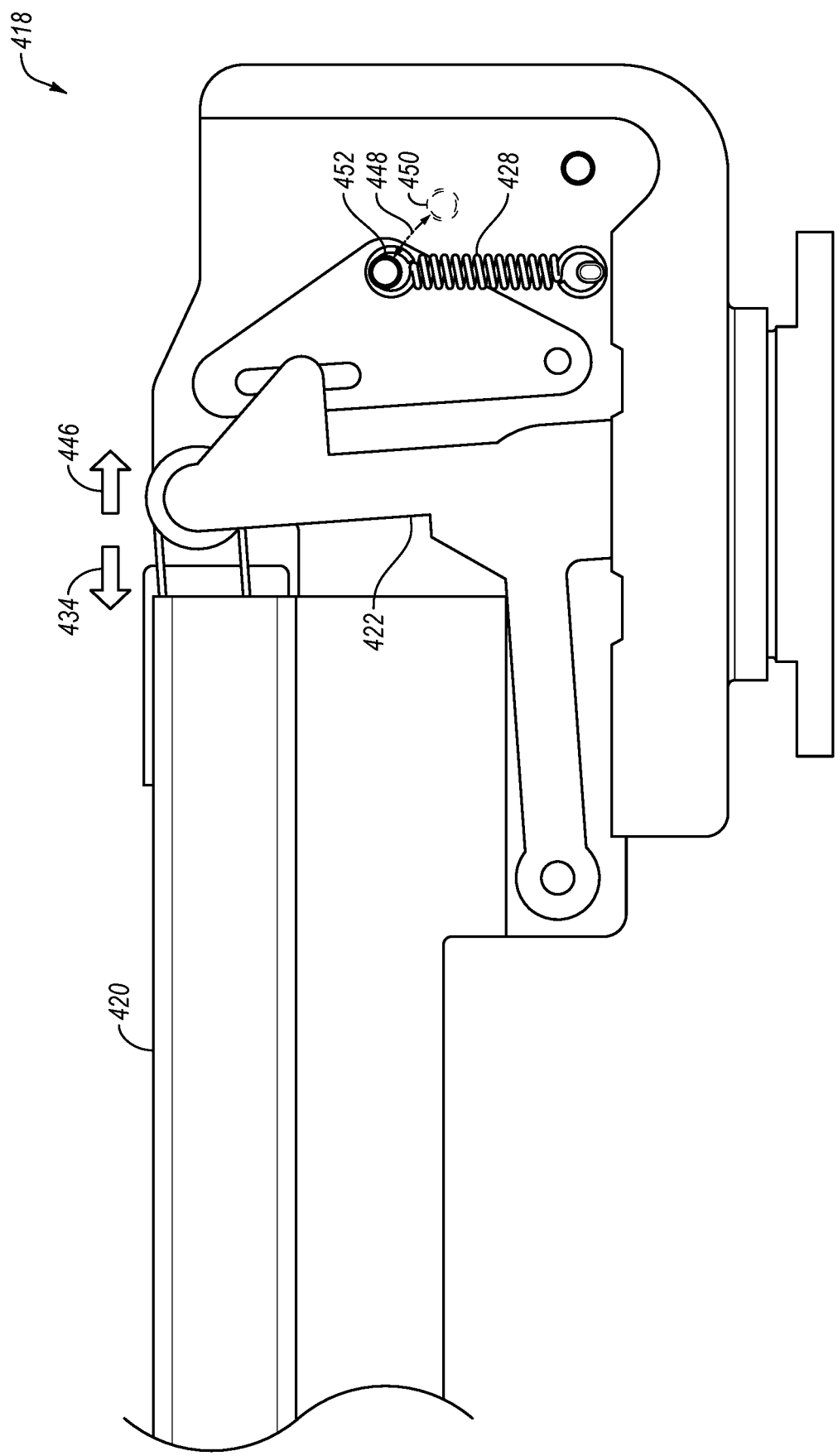
FIG. 8 is a side view of an embodiment of a locking apparatus, according to at least one embodiment of the present disclosure.

FIG. 8 is a side cross-sectional view of another embodiment of a mechanical linkage. In some embodiments, the mechanical linkage may provide a camming mechanism such that the extension of the spring 428 is non-linear relative to the movement of the arm 422. For example, as the actuator 420 applies a contraction force 434 to move the arm 422, the spring 428 is extended non-linearly. An end of the spring 428 may move in an arcuate path 448 from a locked position 450 (i.e., a position when the camming mechanism is in a locked position) to an unlocked position 452 shown in FIG. 8. Therefore, the actuator 420 moves linearly, which the spring extends non-linearly, reducing the work done by the spring 428 and reducing the resultant force 446 opposing the contraction force 434.

Figure 9:
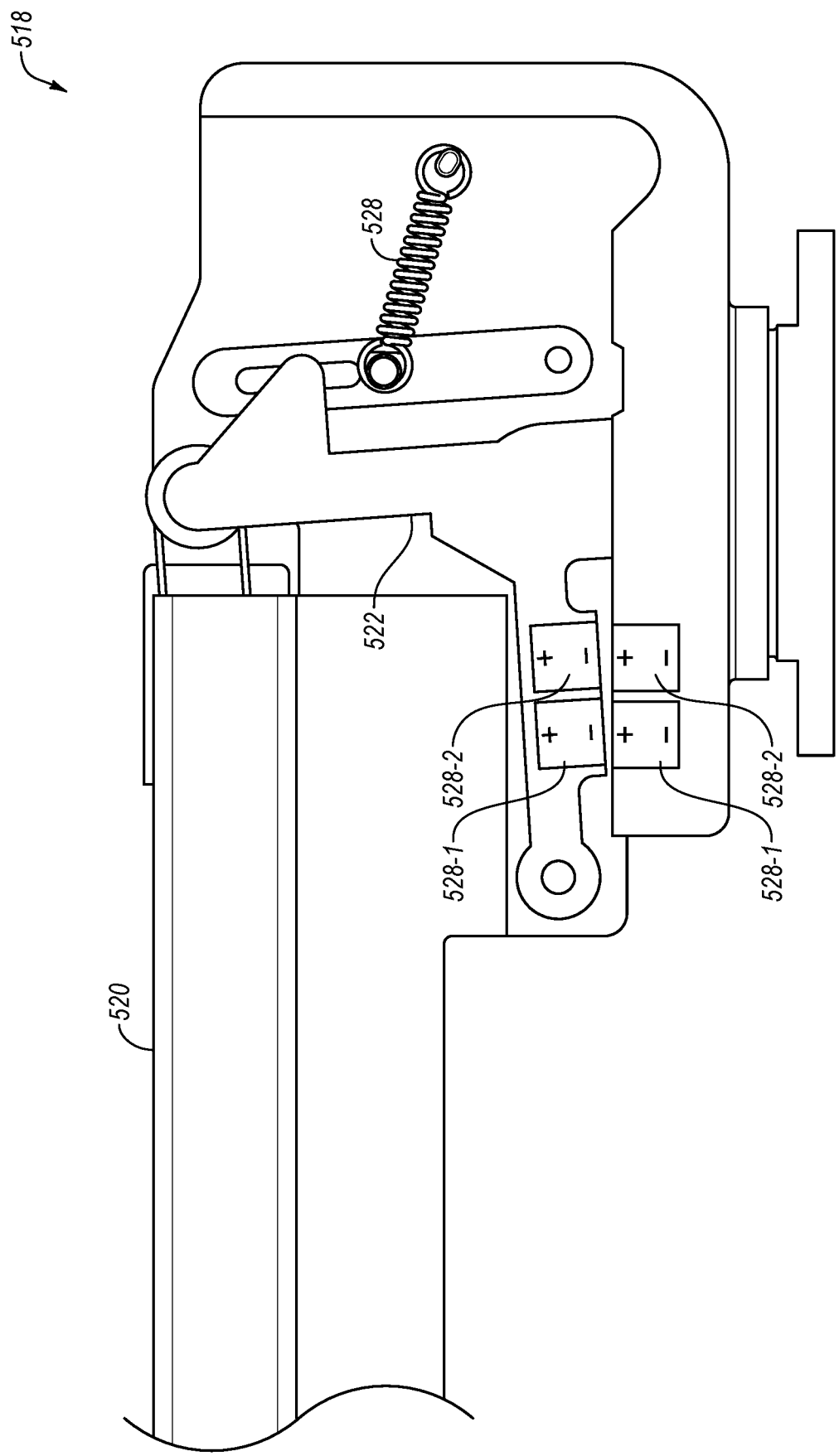
FIG. 9 is a side view of another embodiment of a locking apparatus, according to at least one embodiment of the present disclosure.

While the embodiment of a camming mechanism of FIG. 8 is shown in combination with the embodiment of a sliding-bar linkage of FIG. 6-1 through FIG. 7, it should be understood that the camming mechanism may be used independently or combination with one or more other mechanisms described herein. For example, FIG. 9 is a side view of an embodiment including both a plurality of pairs of magnets 528-1, 528-2 and a mechanical linkage including a lever 542 and spring 528. The actuator 520 may move the arm 522 with the magnets 528-1, 528-2 applying a peak force at in the locked position and decreasing toward the illustrated unlocked position, while the lever 542 and spring 528 apply a lower force in the locked position and increasing in force as the arm 522 reaches the unlocked position.

Figure 10:
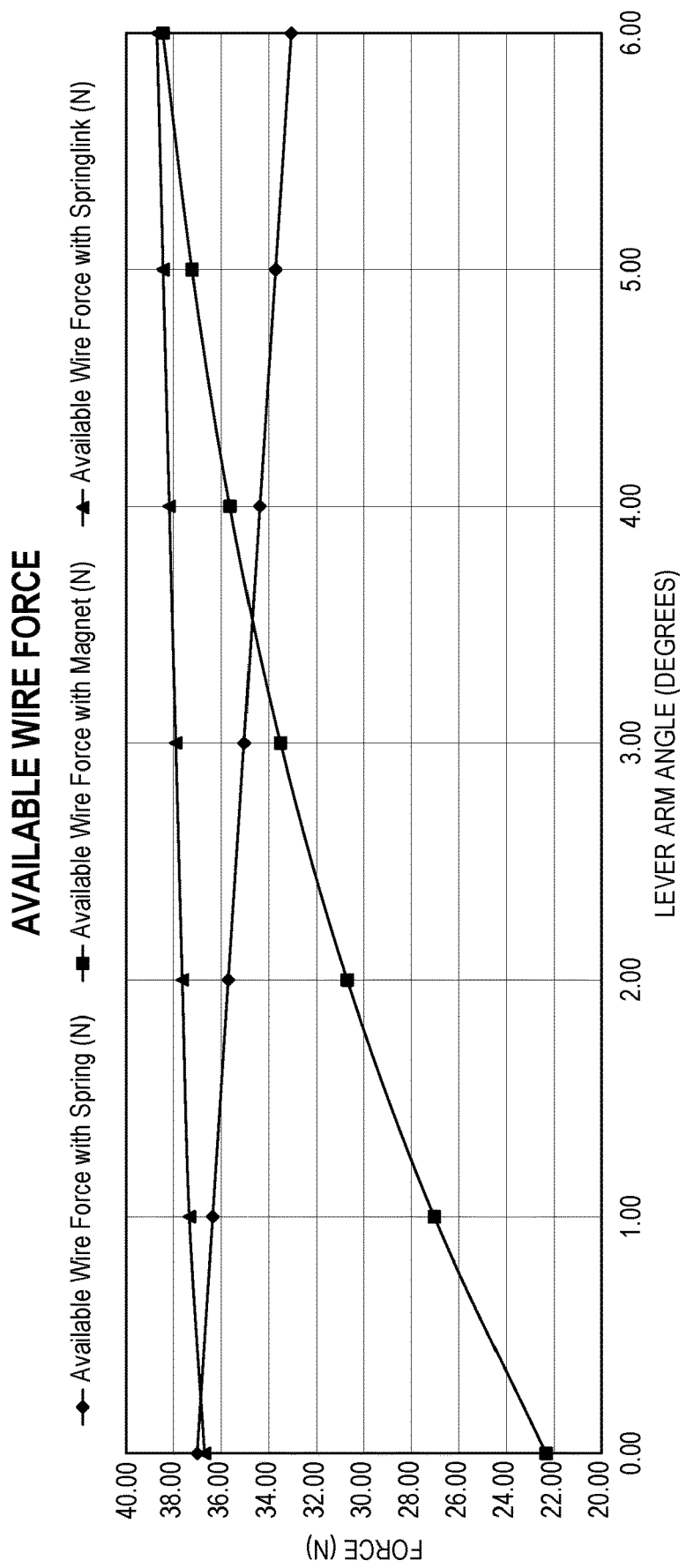
FIG. 10 is a chart illustrating the available actuator force of an embodiment of a locking apparatus, according to at least one embodiment of the present disclosure.

FIG. 10 is a chart illustrating the relative available force to move the arm in a locking apparatus. The chart illustrates the available force in three embodiments of a locking apparatus: a spring force conditioner, such as that described in relation to FIG. 2 through FIG. 3; a magnet based force conditioner, such as that described in relation to FIG. 4-1 through FIG. 5; and a sliding-bar mechanical linkage force conditioner, such as that described in relation to FIG. 6-1 through FIG. 7.

The force applied by the SMM wire and actuator may be substantially linear with respect to the displacement of the arm between the locked position and the unlocked position. The available force at any given point in the movement of the locking apparatus is the net force between the contraction force of the actuator and the opposing force applied by the force conditioner.

For example, the available force of the magnet force conditioner embodiment increases during the transition from the locked position to the unlocked position. The magnets having the highest force at the locked position and reduce in force rapidly after displacement from the locked position. The spring force condition embodiment reduces the overall available force as the spring extends in length between the locked position and the unlocked position. The mechanical linkage with the spring provides the available force curve closest to a flat line (e.g., the same available force throughout the displacement from the locked position to the unlocked position). In some embodiments, a substantially flat force curve may be a force curve that is entirely within a 10% variation between the locked position and the unlocked position of the maximum value of the force curve. For example, the force curve of the mechanical linkage is entirely with about 36.5 N and about 38.5 N. The force curve, therefore, only varies about 2.0 N against a maximum of 38.5 N at the unlocked position, resulting in about a 5.2% variation. In other embodiments, a combination of the embodiments described herein, such as a combination of magnet and spring force conditioners described in relation to FIG. 9 may provide a substantially flat force curve. In at least one embodiment, to produce a substantially flat available force curve, the force applied by the force conditioner may be entirely within a 10% variation between the locked position and the unlocked position of a maximum value of the force applied by the force conditioner.

Figure 11:
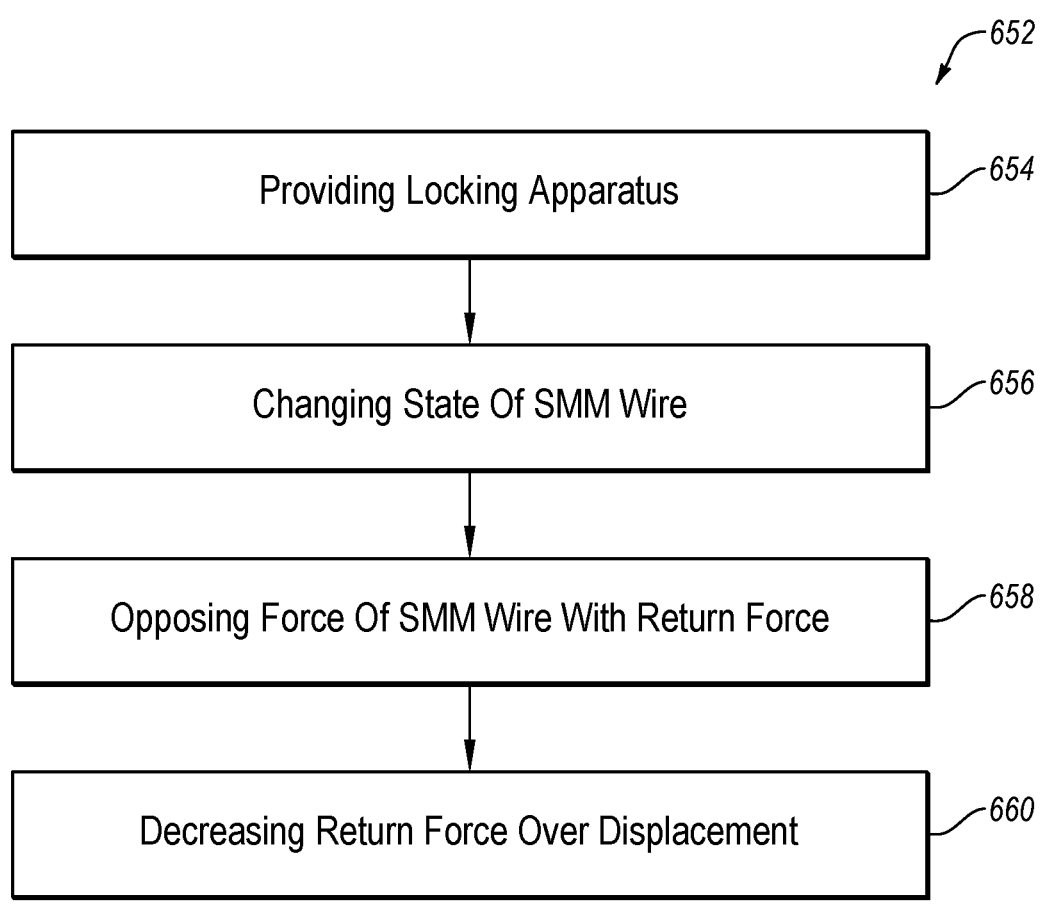
FIG. 11 is a flowchart illustrating an embodiment of a method of locking any electronic device.

FIG. 11 is a flowchart illustrating an embodiment of a method 652 of conditioning the force applied in a locking apparatus. In some embodiments, the method 652 includes providing a locking apparatus with an actuator and a force conditioner, as described herein, at 654. The actuator may include a SMM wire that applies a contraction force to move an arm, and the force conditioner may apply a return force that acts on the arm in a direction at least partially opposing the contraction force. For example, a vector of the return force may be oriented such that at least a component of the return force opposes the contraction force. For example, the return force may have a component that opposes a linear movement of an arm. In other examples, the return force may have a component that opposes a rotation movement of an arm about an axis or pivot point.

The method 652 may include changing a state of the SMM wire at 656. In some embodiments, changing the state may include changing the macrostructure of the SMM wire. In other embodiments, changing the state of the SMM wire may include changing the microstructural state of the SMM wire. For example, changing the state of the SMM wire may include changing the microstructure of the SMM wire from a martensite microstructural phase to an austenite microstructural phase. In at least one example, the SMM wire may be a nickel titanium compound, and changing the state of the SMM wire may include changing the temperature of the SMM wire beyond a transition temperature. In other examples, changing the state of the SMM wire may include applying an electrical current to the SMM wire. In yet other examples, changing the state of the SMM wire may include applying an electrical potential across the SMM wire.

Upon changing the state of the SMM wire, the SMM wire may apply a contraction force in the locking apparatus. The method 652 may further include opposing the contraction force of the SMM wire with a return force at 658. In some embodiments, the return force may act directly upon the arm. In other embodiments, the return force may act upon a mechanical linkage that transmits at least a portion of the return force to oppose the contraction force. For example, the mechanical linkage may be a sliding bar linkage that translates a portion of the return force as a resultant force to oppose the contraction force, as described in relation to FIG. 6-1 through FIG. 7. In other examples, the mechanical linkage may include a camming device to transmit the return force non-linearly to the arm, such as described in relation to FIG. 8.

The method 652 may increase the net available force of the actuator over a conventional locking apparatus by decreasing the return force applied opposite the contraction force of the actuator at 660. For example, as shown in FIG. 10, the force applied opposite the contraction force by the magnet force conditioner or by the sliding-bar mechanical linkage may decrease over the displacement between the locked position and the unlocked position. The decrease in return force transmitted to the arm allows for an increase in the available force of the SMM wire.

In other embodiments, the return force transmitted to the arm may have be tuned to provide a substantially flat force curve of available force. For example, as described in relation to FIG. 10, a substantially flat force curve may be a force curve that is entirely within a 10% variation between the locked position and the unlocked position of the maximum value of the force curve. In other examples, a substantially flat force curve may be a force curve that is entirely within a 5% variation between the locked position and the unlocked position of the maximum value of the force curve.

The force acting against the SMM wire may, in some embodiments, be sufficient to restore the SMM wire to the first state. For example, with a 0.31 mm nickel titanium wire described in relation to FIG. 2, the force acting against the wire may be at least 15 N over the range of motion of the SMM wire.

One or more embodiments of a locking apparatus according the present disclosure may allow for increased available unlocking force over conventional locking apparatuses. In some embodiments, the locking apparatus according to the present disclosure may have a smaller dimensional footprint than a conventional locking apparatus. In other embodiments, the locking apparatus may have a substantially flat available force curve that provides efficient movement of the locking apparatus from the locked position to the unlocked position and back.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An apparatus for locking a computing device, comprising:
    an actuator;
    a locking protrusion connected to a first portion of the computing device;
    a locking receptacle connected to a second portion of the computing device;
    a shape memory metal (SMM) wire connected to the locking protrusion or locking receptacle, the SMM wire having a first state and a second state and movable between the first state and the second state by the actuator, the first state having a first length of the SMM wire and the second state having a second length of the SMM wire that is shorter than the first length, wherein moving from the first state to the second state applies a contraction force along a longitudinal direction of the SMM wire; and
    a means for conditioning a return force to the SMM wire opposite the contraction force to return the SMM wire toward the first state while moving a maximum available force of the SMM wire to the second state of the SMM wire.

2. The apparatus of claim 1, the SMM wire including nickel titanium.

3. The apparatus of claim 1, the first state being a martensite microstructural phase and the second state being an austenite microstructural phase.

4. The apparatus of claim 1, the force conditioner including at least one magnet oriented to apply the return force to the SMM wire.

5. The apparatus of claim 1, the force conditioner including a sliding-bar mechanical linkage.

6. The apparatus of claim 1, the force conditioner applying a greater return force when the SMM wire is in the first state than when the SMM wire is in the second state.

7. The apparatus of claim 1, an available force curve of the SMM wire being within a 10% variation of the maximum available force between the first state and the second state.

8. The apparatus of claim 1, the force conditioner including a spring.

9. An apparatus for locking an electronic device, comprising:
    an actuator containing an SMM wire, the SMM wire configured to apply a contraction force;
    a means for conditioning an opposing force at least partially opposing the contraction force; and
    an arm movable toward an unlocked position by the actuator and movable toward a locked position by the opposing force, wherein the opposing force is within 10% of a maximum opposing force between the locked position and the unlocked position.

10. The apparatus of claim 9, the arm having an arm length between 15 mm and 22 mm.

11. The apparatus of claim 9, the arm having an arm height between 12 and 20 mm.

12. The apparatus of claim 9, the arm having a post positioned in a slot of a lever, the lever connected to the force conditioner.

13. The apparatus of claim 12, a spacing between the arm and the lever being between 2 mm and 7 mm.

14. The apparatus of claim 9, the arm having a first magnet and a second magnet positioned thereon.

15. The apparatus of claim 14, the first magnet positioned a first radial distance from a pivot of the arm, the second magnet positioned a second radial distance from the pivot of the arm, the second radial distance being greater than the first radial distance.

16. An apparatus for locking an electronic device, the apparatus comprising:
    an actuator containing an SMM wire, the SMM wire configured to apply a contraction force along a longitudinal direction of the SMM wire;
    a force conditioner configured to apply an opposing force at least partially opposing the contraction force, the force conditioner including a sliding-bar mechanical linkage; and an arm connected to the force conditioner and the actuator, the arm movable toward an unlocked position by the actuator and movable toward a locked position by the opposing force, wherein a configuration of the actuator, the force conditioner, and the arm is such that the opposing force is maintained within 10% of a maximum opposing force applied by the force conditioner when the arm is moved between the locked position and the unlocked position, so as to provide a substantially flat available force curve between the locked position and the unlocked position.

17. The apparatus of claim 16, the SMM wire having a first state and a second state and movable between the first state and the second state by the actuator, the first state having a first length of the SMM wire and the second state having a second length of the SMM wire that is shorter than the first length, the force conditioner applying a greater return force when the SMM wire is in the first state than when the SMM wire is in the second state.

18. The apparatus of claim 16, an available force curve of the SMM wire being within a 10% variation of the maximum available force between the first state and the second state.

19. The apparatus of claim 16, further comprising a return spring, wherein the force conditioner alters a force curve of the return spring.

20. The apparatus of claim 19, wherein the force conditioner alters the force curve of the return spring to have a net reduction in force applied to the SMM wire.

* * * * *